United States Patent [19]

Amano et al.

[11] Patent Number: 4,654,193
[45] Date of Patent: Mar. 31, 1987

[54] FUEL ASSEMBLY FOR FAST REACTORS

[75] Inventors: Ken Amano, Hitachi; Kotaro Inoue, Toukai, both of Japan

[73] Assignee: Hitachi, Ltd., Tokyo, Japan

[21] Appl. No.: 603,824

[22] Filed: Apr. 25, 1984

[30] Foreign Application Priority Data

Apr. 28, 1983 [JP] Japan ................... 58-75405

[51] Int. Cl.⁴ ................................. G21C 3/32
[52] U.S. Cl. ..................... 376/436; 376/434; 376/435
[58] Field of Search ............ 376/436, 434, 435

[56] References Cited

U.S. PATENT DOCUMENTS 4,147,591  4/1979  Miki ...................... 376/436
4,235,669  11/1980 Burgess ................. 376/436

FOREIGN PATENT DOCUMENTS 53-107587  9/1978  Japan .
56-57985   5/1981  Japan .

Primary Examiner—Donald P. Walsh
Attorney, Agent, or Firm—Antonelli, Terry & Wands

[57] ABSTRACT

This invention relates to a fuel assembly for fast reactors and aims to reduce stresses induced in fuel pins by interaction between a wrapper tube and a bundle of fuel elements each of which consists of the fuel pin and a wire spacer wound around the fuel pin. The fuel elements consists of two kinds of fuel elements, one of them consists of conventional fuel pins and wire spacers and the other fuel pins of smaller diameter than the conventional fuel pins and wire spacers of larger diameter than the conventional wire spacers whereby the fuel assembly is provided with larger space therein.

15 Claims, 15 Drawing Figures

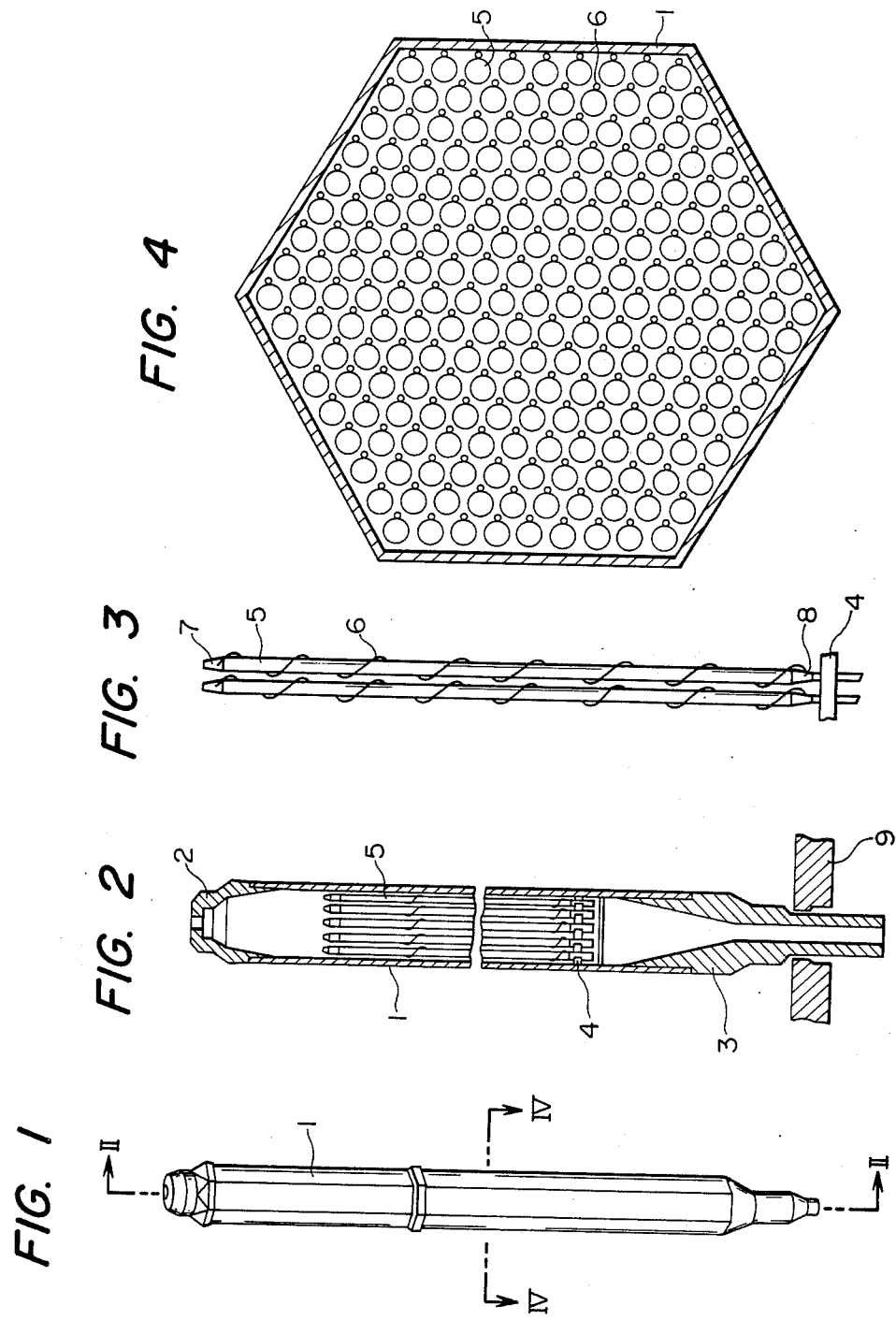

FUEL ASSEMBLY FOR FAST REACTORS

BACKGROUND OF THE INVENTION

This invention relates to a fuel assembly for fast reactors and more particularly to a fuel assembly for fast reactors in which stresses by interaction between a wrapper tube and a bundle of fuel elements can be reduced.

A conventional fuel assembly for fast reactors comprises a hexagonal wrapper tube and a bundle of fuel elements consisting of fuel pins and wire spacers wound around the fuel pins to prevent the fuel pins from contacting with each other and to keep a coolant passage therebetween. The fuel assembly is loaded in a fast reactor core and the fuel pins are burned for 2 to 3 years to produce heat energy. The heat energy is removed by a coolant (for example sodium). The maximum temperature of the coolant reaches to about 640° to 680°. Constructional materials of the fuel assembly, that is, fuel pin claddings, the wire spacers, etc. (these elements are made of stainless steel) are exposed to high speed neutron beams generated through nuclear fission and to a high temperature, as a result, they expand due to swelling and creep.

In the reactor core, the wrapper tube receives forces from inside of the wrapper tube toward the outside by pressure of the coolant, so that the wrapper tube creeps and expands. The fuel pins receive forces from the inside toward the outside by pressure of nuclear fission product gas contained in the fuel pins. As a result, creep takes place and the fuel pins expand. The wire spacers also expand due to swelling. Further, tensile strength caused by winding of the wire spacer causes creep in the wire spacers, whereby the wire spacers expand, but the volume of expansion is less than these of the fuel pins and the wrapper tube.

The fuel pins are bent complicatedly due to the difference of thermal expansion caused by uneven temperature distribution in coolant for the fuel assembly and due to an effect of so-called thermal expansion in addition to the above-mentioned swelling and creep, so that the fuel assembly presents complicated deformation.

At the beginning of loading the fast reactor with the fuel assemblies, a diameter (B) of the bundle of fuel elements in the wrapper tube is less than a dagonal length (E) of the inside of the wrapper tube. As the fuel assembly burns, both the diameter (B) and the diagonal length (E) become larger because of expansion of the various elements for fuel assembly. However, in general, since the expansion of the bundle diameter (B) is larger than that of the diagonal length (E) of the wrapper tube, the bundle diameter (B) reaches to the diagonal length (E), and finally the former becomes larger than the latter.

That the bundle diameter (B) of the fuel elements is larger than the diagonal length (E) means that the bundle of the fuel elements can not be contained within the wrapper tube geometrically. However, it is known that the bundle of the fuel elements can be contained really within the wrapper tube even if the bundle diameter (B) is larger than the diagonal length (E).

When the bundle diameter becomes larger than the diagonal length (E), the bundle of fuel elements receives such a force from the wrapper tube that the fuel pins are pressed strongly. In general, the expansion of the fuel pins progress faster than the expansion of the wrapper tube. Difference between the bundle diameter (B) and the diagonal length (E),(B−E), increases gradually in a burning period of the wrapper tube. When the difference turns to positive, the bundle of fuel elements receives stresses such that the fuel pins are pressed strongly. As the difference increases, the force that the fuel pins receive becomes. larger, and finally the fuel pins become damaged.

The conventional fuel assembly can not be allowed to stay in the core for a long time because it may be damaged by the interaction between the wrapper tube and the fuel elements. Japanese laid-open patent application No. 56-57985 discloses a proposal for preventing the damage caused by the interaction. In FIG. 5 of the Japanese laid-open patent application, a bundle of fuel elements are wound by a thick hollow tube of a diameter of about 4 mm. The Japanese laid-open patent application says that the hollow tube is crushed by the bundle of fuel elements as the fuel elements expand, so that the expansion is absorbed in the hollow tube. According to this method, a wrapper tube inherently becomes larger and consequently it is necessary to make the core larger. Further, the fuel assembly necessitates a long hollow tube because a winding passage on the periphery of the bundle of the fuel elements is large.

SUMMARY OF THE INVENTION

An object of the invention is to provide a fuel assembly for fast reactors, wherein stresses induced in fuel pins by interaction due to expansion between a wrapper tube and the fuel pins with wire spacers spirally wound thereabout can be greatly reduced.

Another object of the invention is to provide a fuel assembly for fast reactors in which stresses induced in fuel pins due to expansion of a bundle of fuel pins and a wrapper tube can be prevented from exceeding an allowance without enlarging the wrapper tube and increasing the number of parts of the fuel assembly.

Briefly stated, the invention is in that a part of a bundle of fuel pins contained within a wrapper tube are smaller in diameter than the others and wire spacers wound around the fuel pins of a smaller diameter are larger in diameter than wire spacers wound around the fuel pins of a larger diameter. By this construction, an allowable amount of expansion of the fuel pins and the wire spacers is larger as compared with that of conventional fuel elements, so that the bundle of the fuel pins can be prevented from receiving large stresses.

BRIEF DESCRIPTION OF THE DRAWINGS

FIG. 1 is a perspective view of a fuel assembly;

FIG. 2 is a sectional view of the fuel assembly taken along a line II—II of FIG. 1;

FIG. 3 is a sectional view of fuel pins wound by wire spacers which are employed in the fuel assembly shown in FIG. 1;

FIG. 4 is a sectional view of the fuel assembly taken along a line 4—4 of FIG. 1;

DESCRIPTION OF THE PREFERRED EMBODIMENTS OF THE INVENTION

Figure 5:
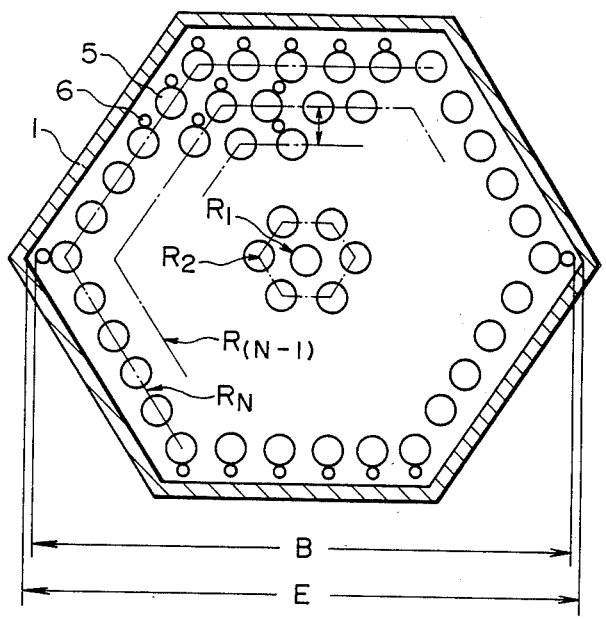
FIG. 5 is a sectional view of a fuel assembly for an explanation relating to BDI.

Referring to FIGS. 1 to 4, an fuel assembly for fast reactors will be described hereinafter in detail.

In FIGS. 1 and 2, the fuel assembly comprises a hexagonal wrapper tube 1, a handling head 2 with a hole for coolant secured to the upper end of the wrapper tube 1, a nozzle 3 secured to the lower end of the wrapper tube 1, a supporting plate 4 secured to a lower inner portion of the wrapper tube 1, and a plurality of fuel elements disposed in the wrapper tube 1. As shown in FIG. 3, each of the fuel elements comprises a fuel pin 5 and a wire spacer 6 spirally wound around the fuel pin 5. The fuel pin 5 comprises an upper plug 7 and lower plug 8 secured to the upper end and lower end of the fuel pin 5, respectively, and nuclear fuel (not shown) inserted in the fuel pin 5. The fuel pin 5 is inserted in a hole of the supporting plate 4 at the lower end and supported by the plate 4 and free at the top. The fuel pin 5 is separated from adjacent ones by the wire spacer 6 to keep a distance therebetween. A plurality of the fuel elements are arranged in rows in the wrapper tube 1 in three directions as shown in FIG. 4. The wrapper tube 1 is inserted in a reactor core (not shown) and supported by a plate 9 secured to the core. Coolant such as liquid sodium enter the wrapper tube 1 at the nozzle 3 and goes out from the hole of the handling head 2 through passages formed between the fuel pins 5.

Figure 6A:
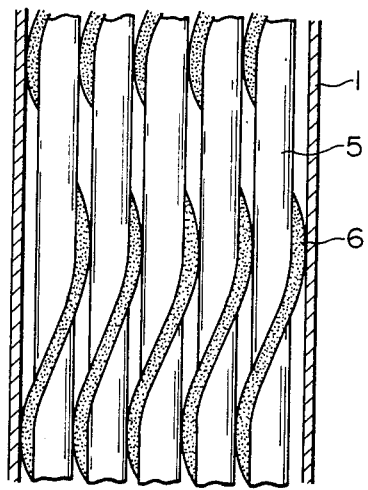
FIGS. 6 (a) and (b) are sectional views of a fuel assembly for explaining BDI.

The BDI (Bundle-Duct-Interaction; simply referred to as BDI) will be explained further, referring to FIGS. 5, 6(a) and 6(b).

In order to quantitively describe the interaction due to expansion between the wrapper tube and the bundle of fuel elements, BDI quantity is defined. The brief explanation is given as follows;

First, the bundle diameter B (diameter of the bundle of the fuel elements), which is already stated, is defined as follows;

$$B = (2N-1)(D+Dw) + Dw \qquad (1)$$

wherein
N: the number of rings R (the number of layers counted from the center of the bundle of the fuel elements),
D: the diameter of the fuel pin,
Dw: the diameter of the wire spacer, and
E: the diagonal length of inside of the wrapper tube.

Next, BDI quantity is defined as follows;

$$\text{BDI quantity} = B - E \qquad (2)$$

Namely, the BDI quantity is one to denote an amount of expansion of the bundle of the fuel elements relative to the wrapper tube. The BDI quantity is a negative (−) amount at the beginning of the burn up. As the burn up progresses, the BDI quantity increases, turns to be positive (+) and finally, exceeds the allowance.

In a conventional fuel assembly, the range of allowance of the BDI quantity which is experimentally found out is as follows;

$$\text{BDI quantity} \geq 2 \, Dw \qquad (3)$$

Figure 6B:
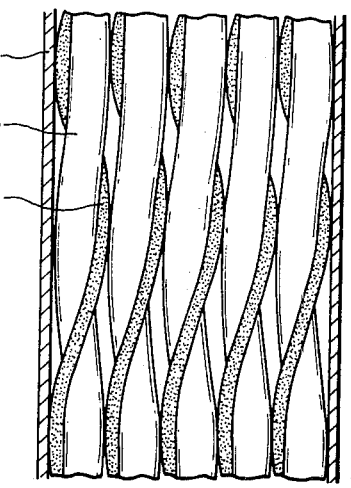

As apparent from FIG. 6(b), the maximum value of the BDI quantity allowed geometrically is 1 Dw in an example of FIG. 6. When the BDI quantity is larger than 1 Dw, the bundle of the fuel elements can not be contained within the wrapper tube as long as FIG. 6 (b) shows. However, in the bundle of the fuel elements, the pins seem to bend, twist, consequently turn into gaps between the pins, which is viewed on a horizontal section of the bundle of the fuel elements. For this turning effect, the allowable BDI quantity is much larger than 1 Dw, consequently, it becomes the amount given by the equation (3).

Figure 7:
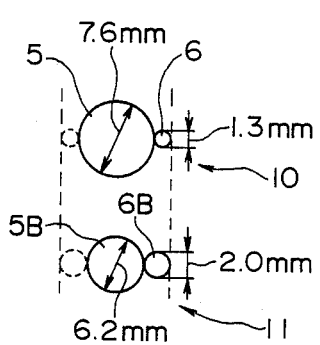
FIG. 7 is sectional views of fuel elements according to an embodiment of the invention.

An embodiment of the present invention is to provide the fuel assembly with two kinds of fuel elements 10, 11 as shown in FIG. 7. Namely, one of them is an A-type fuel element 10 which is the same construction as the conventional one, that is, it is constructed by a fuel pin 5 of a diameter Da, 7.6 mm and a wire spacer 6 of a diameter Dwa, 1.3 mm. The other is a B-type fuel element 11 which is constructed by a fuel pin 5B and a wire spacer 6B. The fuel pin 5B has a diameter Db of 6.2 mm which is smaller than that of the fuel pin 5. The wire spacer 6B has a diameter Dwb of 2.0 mm which is larger than the wire spacer 6.

The dimensional relation between the two types of fuel elements 10 and 11 is as follows;

$$Da + 2\,Dwa = Db + 2\,Dwb.$$

Figure 8:
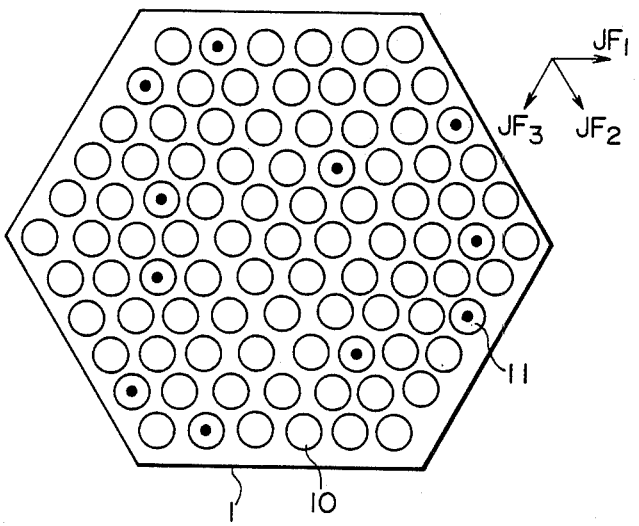
FIG. 8 is a sectional view of a fuel assembly for explaining an arrangement of a bundle of fuel elements according to an embodiment of the invention.

An example of arrangement of the fuel elements 10 and 11 in the wrapper tube 1 is as shown in FIG. 8. The B-type fuel elements 11 indicated by the solid dot are arranged in a bundle of the A-type fuel elements 10, that is, one of the B-type fuel elements 10 is disposed in each row of the three directions JF1, JF2 and JF3. The necessary number of the B-type fuel elements 11 is (2N−1), wherein N is the number of layers of fuel pins 10, 11 counted from the center of the bundle of the fuel pins. In the example of the FIG. 8, the number of the B-type fuel elements is 11. Namely, the arrangement of the fuel elements 10 and 11 in this example is realized by (2N−1) of the B-type fuel elements.

Figure 9:
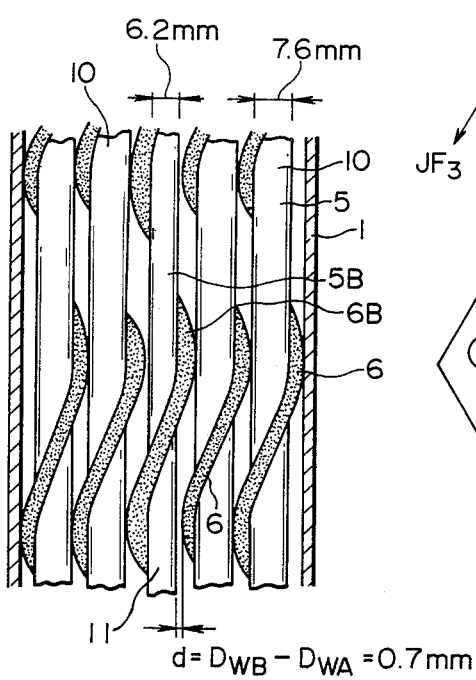
FIG. 9 is a sectional view of a fuel assembly for explaining BDI of the fuel assembly according to the invention.

Referring to FIG. 9, the principle that the BDI in the example of FIG. 8 is reduced will be explained hereinafter.

Even if A-type fuel elements 10 and the B-type fuel elements 11 are mixedly arranged in each row of the fuel elements, a pitch between the fuel pins (a distance between adjacent fuel pins) is constant because the diameter Db of the fuel pin 5B and the diameter Dwb of the wire spacer 6B of the fuel element 11 are determined to satisfy the above-mentioned dimensional relation between the two types of fuel elements. However, as shown in FIG. 9, there is a gap (d=Dwb−Dwa) formed between the A-type fuel element 10 and the B-type fuel element 11. Namely, geometrically, the expansion of the bundle of the fuel elements can be absorbed more by (d). In this example, (d) is 0.7 mm, and this corresponds to about 0.5 Dwa. Namely, it means that a geometrical space for the BDI is made in the bundle of the fuel elements.

Figure 10:
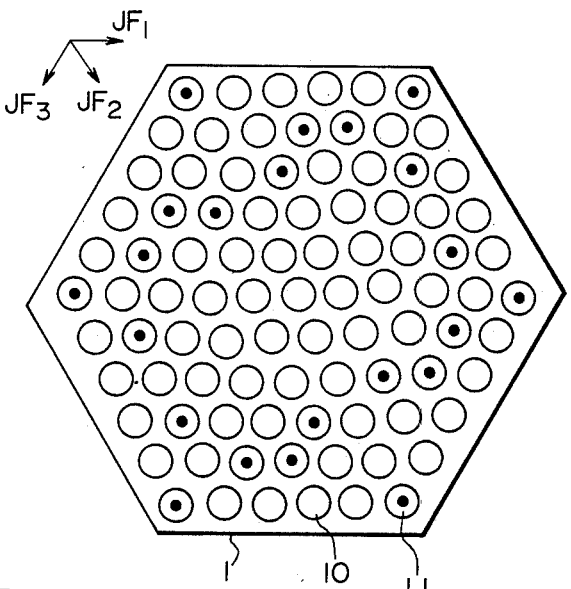
FIGS. 10 to 13 each are a sectional view showing another arrangement of the fuel elements according to the invention.

Another arrangement of the fuel elements 10 and 11 will be described referring to FIG. 10.

In this example, the bundle of the fuel elements 10 and 11 are arranged such that two B-type fuel elements 11 are disposed in any rows of the fuel elements in each of three directions. In this case, a geometrical space for the BDI is 1.4 mm, that is, about 1 Dwa.

When the geometrical space for the BDI increases, an allowance for the BDI caused by an effect of turning of the fuel pins into a row from the adjacent rows also increases drastically, so that the fuel assembly with such an arrangement of the fuel elements can stay in the reactor core for a long time without damage.

As the number of the B-type fuel elements 11 increases, allowance for the BDI increases, which, however, is to increase the number of the fuel pins 5B which are smaller in diameter and to reduce the volume of the burning part of the bundle of fuel elements. Therefore, it is desirable to limit the number of the B-type fuel elements 11 to the smallest extent necessary for allowance of the BDI.

Figure 14:
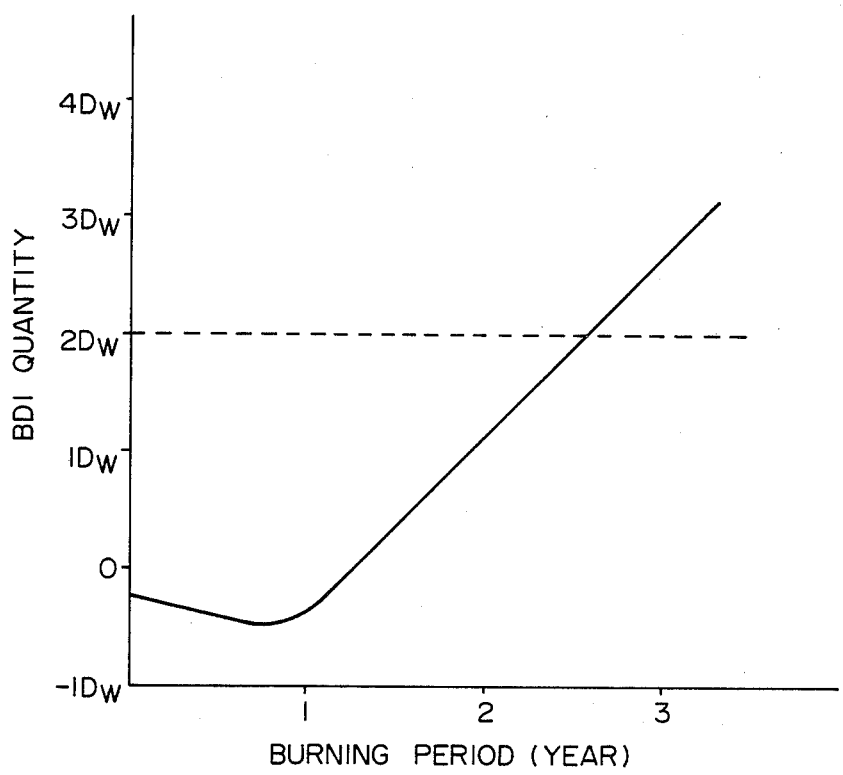
FIG. 14 is a graph showing a relationship between BDI quantity and burning time of a fuel assembly.

The number of the B-type fuel elements 11 arranged in the bundle of the fuel elements 10 and 11 is determined as follows:

In FIG. 14, showing an example of BDI quantity change to lapsed time according to burning of a fuel assembly loaded in the core, the BDI quantity which is a negative amount before loading decreases further at the beginning of the burning of the fuel assembly, which is because an expansion of the wrapper tube 1 is larger than the fuel elements 10 and 11. Then, as the burning progresses, the expansion amount of the the fuel elements becomes to exceed that of the wrapper tube and the BDI quantity increases. In the example of FIG. 14, the BDI quantity exceeds a limit after about 2 years, and excessive stresses are induced in the fuel elements. In this case, however, when the burning period of the fuel assembly is set to 2 years, no troubles take place. When a burning period for three years is desired, it is necessary to previously provide a gap of about 1 Dw by the B-type fuel elements. This is achieved by the arrangement, as shown in FIG. 10, that two of the B-type fuel elements 11 are contained within any rows.

Under the condition that at least one of the B-type fuel elements is arranged in each row of the fuel pins, the least number of the B-type fuel elements is $(2N-1)$. In this case, if for example, the number of fuel pins is 271 ($N=10$), the number of the B-type fuel elements 11 is 19, and if the diameters of the fuel pins 5 and 5B are ones in FIG. 7, the volume reduction of the burning part of the bundle of the fuel elements is only about 2%. When two of the B-type fuel elements are arranged in each row under the same condition as the above except for the number of the B-type fuel elements, the volume reduction of the burning part of the fuel elements is about 4%.

Figure 11:
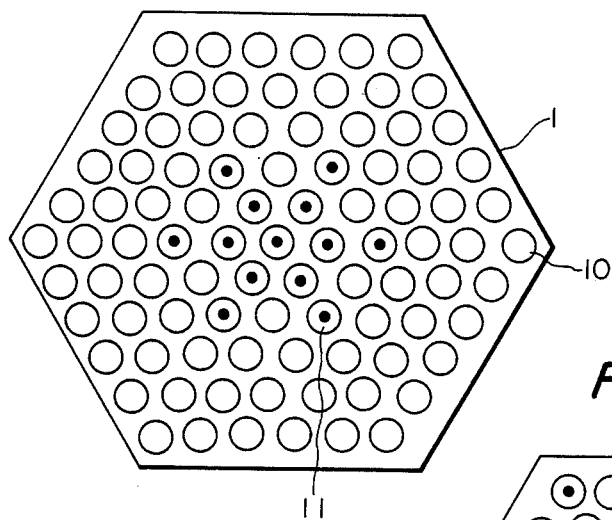

FIG. 11 shows another embodiment of the invention. In FIG. 11, the B-type fuel elements 11 are disposed only at the center and around the center of the bundle of the fuel elements and 11. This arrangement is effective to reduce the BDI because forces applied on the fuel elements from the wrapper tube are always directed toward the center of the bundle of the fuel elements, and the BDI takes place intensely in rows having the largest number of the fuel pins.

Referring to FIG. 14, when the burning period is set to three years, as previously stated, it is necessary to provide a gap of about 1 Dw for reducing the BDI. In the arrangement shown in FIG. 11, when the bundle of the fuel elements 10, 11 expand, they are pressed by the wrapper tube 1 toward the center of the bundle of fuel elements. Therefore, if the gap of 1 Dw (corresponding to two of the B-type fuel elements 11) is provided at the central portion, the BDI can be reduced even if there are rows that there are no B-type fuel elements 11. Accordingly, if the fuel elements of two layers from the center (a central B-type fuel element 11 and B-type fuel element layer surrounding the central fuel element) are replaced by the B-type fuel elements 11, the fuel elements 10,11 can be used in the core for three years.

As above-mentioned, in order to provide a gap of 1 Dw for reducing the BDI, one of the following arrangements can be taken;

(1) the arrangement of the fuel elements that two of the B-type fuel elements 11 are included in any row of the fuel elements.

(2) the arrangement that all the fuel elements of two layers from the center are replaced by the B-type fuel elements.

Figure 12:
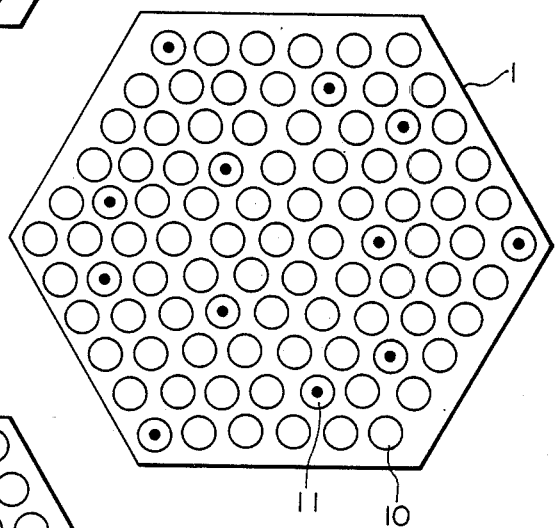

Referring to FIG. 12, further another embodiment of arrangement of the fuel elements according to the invention will be described hereinafter.

In FIG. 12, the arrangement is characterized in that the B-type fuel elements are disposed in the bundle of the fuel elements to be in a radial symmetry. The arrangmeent of the FIG. 11 also has a radial symmetry. These arrangements has an advantage that it is not needed to consider the orientation of the wrapper tube when the wrapper tube is inserted in the core because even if any face of hexagonal faces of the wrapper tube is directed toward the center of the core, the arrangement of the bundle of the fuel elements to the core is the same.

Figure 13:
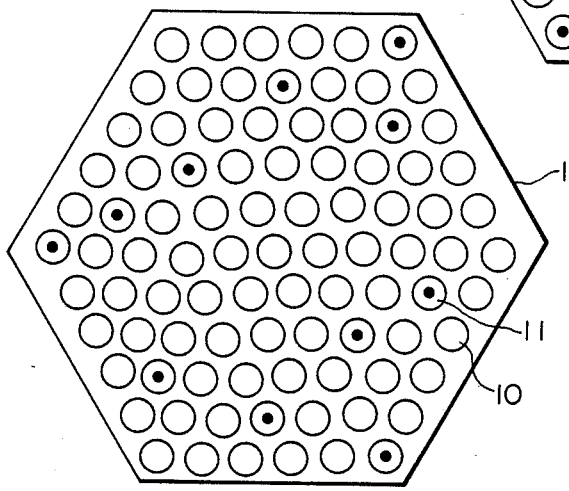

Referring to FIG. 13, still another embodiment of arrangement of the fuel elements according to the invention will be described.

In FIG. 13, each row of the fuel elements 10 and 11 includes one B-type fuel element 11 and the outermost layer of the fuel elements has the least number of the B-type fuel elements (three B-type fuel elements in this arrangement). The arrangement in FIG. 11 is the same as this arrangement. This arrangement that the least number of the B-type fuel elements are disposed in the outermost layer is effective in reduction of concentration of coolant on the periphery of the bundle of the fuel elements due to small diameter of the fuel pins 5B.

According to the invention, the allowance for the BDI increases and the expansion of the bundle of the fuel elements can be absorbed without enlarging the diameter of the wrapper tube, increasing parts of the fuel assembly, and increasing the area of coolant flow at the periphery of the bundle of the fuel elements. Further, since the pitch of winding of the wire spacer is the same as conventional one and the number of points supporting the adjacent fuel pins also in the same as conventional one, a contact prevention effect between the adjacent fuel pins is not lowered.

What is claimed is:

1. A fuel assembly for fast reactors comprising:
   a wrapper tube for containing a bundle of fuel elements; and
   a plurality of fuel elements arranged in rows in said wrapper tube to form said bundle of fuel elements, said plurality of fuel elements including fuel pins of a first diameter having a wire spacer of a first diameter wound therearound to maintain a distance between said fuel pins, said fuel pins of said first diameter and said wire spacers of said first diameter forming a major part of said bundle of fuel elements, and fuel pins of a smaller diameter than said fuel pins of said first diameter having a wire spacer of a larger diameter than said wire spacers of said first diameter, wound therearound, said fuel pins of smaller diameter and said wire spacers of said larger diameter forming a minor part of said bundle of fuel elements and being dispersedly arranged in said major part of said bundle of fuel elements.

2. A fuel assembly according to claim 1, wherein each row of said bundle of fuel elements includes the same number of said fuel pins of smaller diameter and said wire spacers of larger diameter.

3. A fuel assembly according to claim 1, wherein said fuel pins of said smaller diameter and said wire spacers of said larger diameter are dispersedly arranged in said major part of said bundle of fuel elements of said fuel pins of said first diameter and said wire spacers of said first diameter so that a pitch between adjacent ones of said fuel pins of said first diameter and said fuel pins of said smaller diameter is substantially equal to a pitch between adjacent ones of said fuel pins of said first diameter.

4. A fuel assembly according to claim 3, wherein the pitch between adjacent ones of said fuel pins of said first diameter and said fuel pins of said smaller diameter is substantially equal to a pitch between adjacent ones of said fuel pins of said smaller diameter.

5. A fuel assembly according to claim 1, wherein said fuel pins of said first diameter and said wire spacers of said first diameter are arranged at a periphery of said bundle of fuel elements and at a central portion of said bundle of fuel elements.

6. A fuel assembly according to claim 1, wherein said fuel pins of said smaller diameter and said wire spacers of said larger diameter are arranged at a periphery of said bundle of fuel elements and at a central portion of said bundle of fuel elements.

7. A fuel assembly for fast reactors comprising:
a hexagonal wrapper tube;
an entrance nozzle for coolant provided on a lower end of said wrapper tube;
a handling head provided on the other end of said wrapper tube and having a coolant outlet opening;
a supporting member secured to a lower inside portion of said wrapper tube; and
a bundle of fuel elements arranged in rows in three directions equiangularly oriented in said wrapper tube and supported by said supporting member, said bundle of fuel elements consisting of A-type fuel elements and B-type fuel elements, the number of B-type fuel elements being substantially less than the number of said A-type fuel elements, said A-type fuel elements consisting of fuel pins of a first diameter having a wire spacer of a first diameter wrapped therearound, said B-type fuel elements consisting of fuel pins smaller in diameter than said fuel pins of said A-type fuel elements and having a wire spacer larger in diameter than said wire spacers of said A-type fuel elements wrapped therearound, said B-type fuel elements being dispersedly arranged in each row of said bundle of fuel elements so that a sum of gaps formed between said wire spacers of said A-type fuel elements and said fuel pins of said B-type fuel elements increases by at least one-half of the diameter of said wire spacer of said A-type fuel element, and a pitch between adjacent ones of said A-type and B-type fuel elements in said bundle of fuel elements is substantially equal to a pitch between adjacent ones to said A-type fuel elements.

8. A fuel assembly according to claim 7, wherein the pitch between adjacent ones of said A-type and B-type fuel elements is substantially equal to a pitch between adjacent ones of said B-type fuel elements.

9. A fuel assembly according to claim 7, wherein each row of the fuel elements includes at least two of said B-type fuel elements.

10. A fuel assembly according to claim 7, wherein said B-type fuel elements are arranged in said bundle of fuel elements so as to have a radial symmetry.

11. A fuel assembly for fast reactors comprising:
a wrapper tube;
a plurality of first fuel pins arranged in rows in said wrapper tube and forming a major part of a bundle of fuel pins;
a plurality of first wire spacers, one of said first wire spacers being wound around a respective one of said first fuel pins so as to maintain a distance between adjacent ones of said first fuel pins;
a plurality of second fuel pins arranged in said rows of said first fuel pins and forming a minor part of said bundle of fuel pins, said second fuel pins having a diameter smaller than the diameter of said first fuel pins;
a plurality of second wire spacers, one of said second wire spacers being wound around a respective one of said second fuel pins, said second wire spacers having a diameter larger than the diameter of said first wire spacers, a pitch between adjacent ones of said first and second fuel pins being substantially equal to a pitch between adjacent ones of said first fuel pins, said second fuel pins and said second wire spacers being arranged in said rows of said plurality of said first fuel pins and said first wire spacers so that a sum of gaps between said first wire spacers and said second fuel pins in each of said rows is approximately the diameter of one of said first wire spacers.

12. A fuel assembly according to claim 11, wherein said fuel pins are arranged in layers with the center of said bundle of fuel pins being a first layer, and two layers of fuel pins from the center of said bundle consisting of said second fuel pins.

13. A fuel assembly according to claim 11, wherein the pitch between adjacent ones of said first fuel pins and said second fuel pins is substantially equal to a pitch between adjacent ones of said second fuel pins.

14. A fuel assembly according to claim 11, wherein said first fuel pins are arranged at a periphery of said bundle of fuel pins and at other portions of said bundle of fuel pins.

15. A fuel assembly according to claim 11, wherein said second fuel pins are arranged at a periphery of said bundle of fuel pins and at other portions of said bundle of fuel pins.

* * * * *